Patented Dec. 16, 1952

2,622,031

UNITED STATES PATENT OFFICE 2,622,031

COMPOSITION OF MATTER AND METHOD OF PRESERVING FOOD IN RAW STATE

Lawrence Frandsen, Seattle, Wash., assignor to Washington Laboratories, Inc., Seattle, Wash., a corporation of Washington No Drawing. Application September 27, 1951, Serial No. 248,649

46 Claims. (Cl. 99—156)

My invention relates to an antiseptic to retard bacterial decomposition of food.

More particularly, my invention relates to the providing of an antiseptic which will retard the decomposition by bacterial or fungus growth of easily perishable foods, such as fish, crab, shrimp, lobster, and other sea foods in their raw state, also certain vegetables as lettuce, cauliflower, celery, kale, carrots, etc., in their raw state, apple juice, vegetable juices, and orange and grapefruit juices. Also my invention relates to the retarding of bacteria and spore producing mold on the skins of oranges, lemons, grapfruit, tangerines, and guava fruit. The above examples are cited by way of illustrations and not as limitations.

In its broad aspect, my invention relates to the discovery of the property of maleic acid to increase the potency of sodium benzoate and boric acid in retarding the decomposition by bacteria of foods, or the property of maleic acid in combination with sodium benzoate or in combination with boric acid to provide a very improved preserving compound.

This application is a continuation in part of application filed by me October 29, 1945, Serial No. 625,457, for "Composition of Matter and Method of Preserving Food in Raw State," and application filed by me on December 23, 1950, Serial Number 202,569, for "Composition of Matter and Method of Preserving Food in Raw State."

The preserving of foods presents many problems. In applying chemicals, care must be taken that the chemicals are such as are not toxic in the concentrations necessary to be employed to obtain effective action against the food destroying agencies. Also the chemical must be of a character as not to affect the taste and at the same time must be sufficiently potent to negate the action of the agencies operating against the preservation of the food. When freezing or refrigerating temperatures are employed in preserving, then the maintenance of such temperatures is vital as such food readily spoils or is often objectionably affected by even a short thawing or failure of temperature control. At this point is where an effective preservation compound or agency is of very great importance. My antiseptic composition functions to preserve the food until the same is re-refrigerated or used in a reasonable time.

The purpose of my invention is to provide a new composition of matter formed from water soluble chemicals, maleic acid, sodium benzoate, and boric acid, or maleic acid and sodium benzoate, or maleic acid and boric acid, which composition or sub-combination compositions function as an antiseptic in retarding the bacterial decomposition of foods, as herein set forth, and which composition, or its sub-combinations, is harmless to humans in the concentrations employed as appears from tests to date. These compositions may be applied to food as above illustrated in the raw state as a solution, or it may be applied as a solution and then frozen in situ on the food, whereby later it may operate to tide over a period of failure of temperature maintenance, or the solutions may be frozen as ice and the ice applied to the food and be available for action as the ice melts, or by dipping. Also my invention may be applied to the said fruit juices and vegetable juices wherein the juices take the part of the solvent, i. e. water. Thus the composition of my invention is characterized by its adaptability in that it may be applied in modes of application, differing greatly in character. When applied as ice, it is preferable, in the case of many foods, to have the ice in crushed state.

My invention will be described for purposes of illustration, definiteness and clearness, as applied to lettuce and fish.

In the shipping of lettuce, a layer of paper is placed in the bottom of the crate and then a scoop of crushed ice is put in the bottom; then a layer of lettuce with the butts (the part where the roots are cut off) upwardly disposed; then a scoop of crushed ice is put over this layer of lettuce; then another layer of lettuce is put in; then another scoop of crushed ice is placed over these; then a third layer is put in; then a scoop of crushed ice is put over these butts; then paper is placed covering the top; and then the lid of the crate is applied.

After the crate is packed in the refrigerating car, crushed ice is also applied over the top of the crate. The ordinary temperature in a refrigeration car is 33° F. If the temperature of the car was made colder there would be danger of freezing the product itself. Immediately upon shipping, the ice begins to melt about the product, and at the end of the five-day period, slime (bacterial growth) begins to form on the lettuce. Accordingly, if the shipment is going to involve a longer period, then often a re-icing is performed. It is the primary object and purpose of my invention is prolong this period and prevent slime forming. When slime forms, decomposition is taking place and that portion of the product so affected must be thrown away, and by so much, the total weight of the shipment is lost.

As another illustration, the preserving of fish caught at sea and taken aboard the fishing boat will next be considered. The particular species of fish to be considered will be the halibut, which are difficult to preserve as "Grade 1." Halibut are generally caught on hook and line, and after a catch has been made, which might be thirty thousand pounds, and the viscera removed, then the same is "iced" with crushed ice. Crushed ice is placed in the poke (that is, in the belly of the fish from which the viscera has been removed)

and then over the fish. Thereupon the ship proceeds, weather permitting, to make the next day's catch, and these are treated the same as the first day's catch. When the hold of the ship is filled with fish, the ship proceeds to port of sale. After a catch has been made on the fishing ground and before the hold is filled, it may be held by a storm, and thus it may be delayed in returning to the port where it will unload to sell the fish for a considerable period of time, such as two or three weeks. Halibut is a species of fish which is peculiarly subject to turning yellow on the outside and inside of the poke. When this happens, the fish can no longer be graded as No. 1 and must take a lower grade and a correspondingly lower price. A primary object of my invention is to prevent the development of such yellow spots on the fish and the corresponding loss due to the degrading resulting therefrom.

Foods are being retailed in the frozen form more and more. The packer may use the utmost care in the selecting of fine grades of food for packaging and then freeze it under the utmost sanitary conditions and then, in spite of all this, the refrigeration may fail for one reason or another and the frozen packages inadvertently partly thaw while the package is going through the various steps in reaching the consumer. After food has once been frozen and refrigeration is removed, it is well-known that it is peculiarly subject to deterioration or spoiling. It is a fundamental purpose of my invention to provide an antiseptic preparation which will permit such food to be kept from spoiling due to temporary inadvertent thawing. Also, it is a primary purpose of my invention to preserve food which is not subjected to freezing temperatures. Also, it is such purpose of my invention to preserve fruits against the action of molds, and fungus growth.

After extended experimentation, I have discovered a composition of chemicals which is peculiarly effective as an antiseptic for foods and which is soluble in water and operates to prevent or retard bacterial and fungus decomposition of foods. As solutions of said chemicals having said characteristics, I have discovered that maleic acid has the property of increasing the potency of sodium benzoate when formed in a solution; also that it has the property of increasing the potency of boric acid when in solution. These solutions, when in proper proportions as hereinafter set forth, operate to extend the preservation of the food to which they are applied. The conditions for optimum results or less results are set forth herein. For optimum results the composition of chemicals for achieving the purposes herein set forth which I have discovered, comprises employing all three of said chemicals in the preferred range as follows: maleic acid 6 to 9 parts, boric acid 1 to 4 parts, and sodium benzoate 4 to 8 parts, in 32,000 parts of water or juices of fruits or vegetables. The preferred formula is 7.5 parts maleic acid, 6 parts sodium benzoate, 2.5 parts boric acid, and 32,000 parts of water or juices of fruits or vegetables. The widest range is as follows: maleic acid 3.5 to 9 parts, boric acid 1 to 4 parts and sodium benzoate 4 to 8 parts, in 32,000 parts of water or juices of fruits or vegetables.

These chemicals when combined in accordance with my invention have their effective preserving power increased greatly over that when used separately. I have discovered that the maleic acid, which has weak antiseptic properties, has an apparent synergistic effect upon the others—that is, the antiseptic properties of the boric acid and the sodium benzoate are so reacted upon in the solution that their preserving power is increased so greatly that they have a most important commercial value as food conservation agents when combined in accordance with my invention. However, as a matter of fact, whether it is synergism or whether it is the reaction of the agents as between themselves is not definitely known. The scientific explanation of the new properties discovered and taught by applicant may be the result of synergism or it may be the reactive effects of the chemicals in forming new compounds. However, it is positively known that the combination gives the advantageous and greatly improved effects set forth in the tables of the experiments.

The various members of my composition are all soluble in water; therefore, they can be added to water to make a solution, and the solution as a whole frozen into ice; and the ice is ordinarily applied in crushed form to the food. Thus the composition of my invention is adapted to be applied to the food in the raw condition in the standard manner of such application for most of the products to be treated thereby. It will be understood that my composition when put in a frozen form is only effective as the ice melts, or the chemicals may be added directly to the said juices forming the liquid component of the combination, or the solution may be added to the products treated as in the case of crabs, or the products may be dipped as in the case of vegetables or fruits, or the combinations of the dipping and the solution in crushed ice form may be employed. One of the features of the invention noticeable particularly when added to juices is that it preserves the natural flavor of such juices; in fact, the flavor of the products in all cases is substantially unaltered by the use of my invention.

The following will readily disclose the effectiveness of my discovery or invention when employing maleic acid in combination with the other chemicals as herein set forth in preserving food in the raw state. First, the record of preserving lettuce in crates will be set forth:

Six crates of lettuce were packed; three of these crates were packed with ordinary ice as set forth hereinabove, and three crates were packed after the manner set forth hereinabove but with ice prepared with my chemical solution. The six crates were placed in a room of the same temperature as that provided for refrigerating car shipment, namely 33° F., that is, they were placed in a cold storage room having such temperature. Let it be noted that the temperature must be such as not to freeze the food product. After twelve days, one crate of each was opened; that is, one packed with the ordinary ice and one packed with the ice having the composition of chemicals of my invention, hereinafter referred to as "antiseptic ice." In the crate packed with the ordinary ice the lettuce had become slimy and limp and decomposition had commenced in every head without exception; only a small selected part of each head was at all usable for human consumption. In outstanding contrast, the crate packed with the antiseptic ice was free from slime, and every head without exception was crisp. The heads were cut in half so that the center was revealed, and in every instance they were crisp and fresh as when originally packed. There was no sign of decomposition in any of the heads.

On the 22nd day after packing, another crate of each was opened—that is, a crate packed with the ordinary ice and a crate packed with the antiseptic ice; the crate packed with the ordinary ice was wholly unfit for human consumption. The heads were so slimy that there only remained a very small part in the center that might be used for human consumption. In short, the heads had reached that degree of decomposition that in ordinary practice they are thrown away. On the other hand, the crate packed with the antiseptic ice of my invention and opened on the twenty-second day was found to be in the same condition as the antiseptic ice-packed crate opened on the twelfth day. There were no signs of decomposition and no loss of weight was involved in doing any trimming because, as stated, there were no signs of any decomposition. The lettuce was as crisp as when packed.

On the thirtieth day after the packing of said lettuce, the ice had all melted and a crate of each was again opened. The crate packed with the ordinary ice was so badly decomposed that there was now nothing left that could be recovered. In the case with the crate packed with the antiseptic ice of my invention, some of the outer leaves of the heads needed trimming, but this was in no greater degree than is ordinarily done when opened after five days after packing with ordinary ice. In other words, the crate packed and opened on the thirtieth day, containing the antiseptic ice, was found to be in entirely satisfactory and in fine, kept and preserved condition. Each and every head was edible and, in fact, was eaten. The crate was distributed to a number of persons, and the same taken home, eaten, and enjoyed as delicious by all. Let it be noted that in packing cars of lettuce, the ice is also spread over the top of the crate as hereinabove set forth after the crates are placed side by side; but in the test above set forth, no ice was covered over the crate. In other words, the experiment was conducted as a test under the most severe conditions. To experts in the shipping of lettuce, the results were so surprising that they could not believe that the thirty-day lettuce had been preserved for such period.

In the shipment of lettuce alone there is a tremendous loss of the product. Car after car is condemned and is not allowed to go upon the market; therefore, my invention will operate to preserve a great quantity of an essential food product and avoid the loss of thousands of dollars annually of this product. Another experiment was made in connection with fish. The record of such experiment will next be set forth.

A halibut fish ship was supplied with five tons of antiseptic ice of my invention. The ship proceeded to the fishing ground at sea and made its first catch of about twelve thousand pounds of halibut. After removing the viscera, this catch was iced down with the five tons of antiseptic ice as hereinabove mentioned. A storm occurred so that it was six days later before the next catch was made. The ship proceeded to fill its hold and ice down the balance of eviscerated fish with ordinary ice. The fish were sold—that is, both lots; the first catch and the second catch—on the eighteenth day. The oldest of the fish packed in ordinary ice were graded No. 2. These had been out of the water about twelve days and were found to have yellow spots both on the inside of the poke and on the outside of the fish. While these were sold as No. 2 grade; on the other hand, in decided contrast those packed with the antiseptic ice which had been taken from the water eighteen days previously were all free from any yellow spots whatsoever both on the inside of the poke and on the outside of the fish and were sold as Grade No. 1 fish. The total catch was about 30,000 pounds.

Thus, it is manifest that my invention is useful in preserving one of our great natural resources and will enable the fishermen to obtain the prices for Grade 1 and will also preserve the fish against loss due to decomposition, even when delayed by storms in returning to port. In this one field alone, the conservation advantages of my invention are of the utmost importance and were such that experts in that field did not believe it was possible to secure such outstanding results.

The solution employed in preparing the ice for both of the above experiments, that is, the experiment with the lettuce and the experiment for the fish, comprised my preferred formula, which is as follows: maleic acid 7.5 parts; boric acid, 2.5 parts and sodium benzoate, 6.0 parts, in 32,000 parts of water. That .05 of 1% of chemicals could have such effectiveness is indeed most remarkable.

In providing a composition which is to serve as a preservative of food to be marketed, there is the limitation that it must not be required in such large amounts in providing a useful preserving effect that it substantially affects the taste of the foods to be preserved. Moreover, such composition must be economical so that it is practical to be used in preserving food. Thus, it is possible for foods which are produced in one part of the country to be safely and economically shipped to distant parts of the country, even entirely across the country, and by sea to distant ports. Thus, the food treated by my invention may be shipped to ports where it is not now possible to ship it and it becomes available at such points without the loss and without the great danger of its being spoiled, due to unavoidable delays.

The antiseptic properties of boric acid are of such weakness that when it was attempted to preserve the lettuce, for example as set forth above, or the fish, for example, as set forth above, it was a failure when used in concentrations which would not affect the taste or be present in too great amounts. Similarly, the antiseptic properties of sodium benzoate were likewise of such weakness that it was unable to preserve the said products, lettuce and fish, of said experiments for necessary periods of time. And the same is true of the maleic acid when applied alone in said experiments. However, when the three chemicals were applied in combination as set forth herein in connection with said experiments, they had the unexpected and the outstanding beneficial results set forth.

The combination of maleic acid and boric acid also gave unexpected results in increased antibacterial potency, as did also the combination of maleic acid and sodium benzoate.

In order to show in more detail what proportions are necessary to secure improvement in the preserving properties of the chemicals constituting my discovery and invention, namely maleic acid, sodium benzoate, and boric acid, and just when the maleic acid operates to boost the preserving effects of sodium benzoate when used together in my invention and when it, maleic acid, begins to boost the preserving effect of boric acid when used together in my invention, and when it, maleic acid, begins to boost the preserving effect of sodium benzoate and boric acid in combination, detailed tests and experiments are set forth in the tables given below.

These tables of tests and experiments are also set forth for the purpose of making clear the advantages of my invention even when optimum results are not required or desired, that, is when a shorter preserving period is sufficient.

In all the tests the controls comprised ordinary ice made from tap water and the packing was done in the manner ordinarily and customarily followed in shipping and preserving the product to which the table relates. The water employed in preparing the solutions constituting my invention and discovery was tap water, that is, the same source was employed as used in connection with the controls. The tests set forth in the tables, it will be understood, are only part of the many tests that were made and primarily only the tests leading up to, or related to, the critical point where changes begin to appear, are set forth. The results are illustrative of those obtained on the other products. In fact my invention has proven successful on all food tested. What period of preserving is sufficient, may be altered by different modes of transportation, so that a change in proportions which will provide another day or more of time in which the food may be held over untreated food may be a practical improvement. The tables also show the proportions for optimum results. Relative the proportions of the formulae: Of course, if one-half (16,000 parts) of water was used, with the same number of parts of the chemicals given for 32,000 parts, this would be the same as doubling the amount of the chemicals. Wherever herein "parts" are mentioned, it is to be understood that the same refers to "parts by weight."

Table I sets forth tests made on lettuce using maleic acid alone. This was done to give an illustration of the effectiveness of maleic acid when used in different percentages in preserving the lettuce. It will be noted that there was no change until 18 grams of maleic acid were employed, when a substantial change was effected, and it was not until some twenty grams were used that a more nearly practical result was provided. What constitutes a practical result would, of course, depend upon just how long it is desired to preserve the product.

*Table I — Lettuce — Maleic acid*

| Grams of chemical used per 400 lbs. of tap water frozen into ice | | | | | End of 6 days | End of 9 days | End of 12 days | End of 18 days | End of 30 days |
|---|---|---|---|---|---|---|---|---|---|
| Controls, ordinary ice made from tap Water same as used with chemicals | | | | | 15% slime | 40% slime | 80% slime | Decomposed | Decomposed |
| Exp. | Maleic acid, grams | Sodium benzoate, grams | Boric acid, grams | Total grams preservative in 400 lbs. Ice | | | Percent | | |
| 1 | 16 | | | 16 | 15% | 40% | 80 | Decomposed. | Decomposed. |
| 2 | 17 | | | 17 | 15% | 40% | 80 | do | Do. |
| 3 | 18 | | | 18 | 14% | 36% | 80 | do | Do. |
| 4 | 19 | | | 19 | 10% | 28% | 75 | do | Do. |
| 5 | 20 | | | 20 | 6% | 20% | 70 | do | Do. |
| 6 | 25 | | | 25 | Good | 15% | 60 | do | Do. |
| 7 | 35 | | | 35 | do | 10% | 50 | do | Do. |
| 8 | 40 | | | 40 | do | 6% | 40 | do | Do. |
| 9 | 60 | | | 60 | do | 4% | 40 | do | Do. |
| 10 | 90 | | | 90 | do | Good | 36 | do | Do. |
| 11 | 120 | | | 120 | do | do | 34 | 80% slime | Do. |
| 12 | 180 | | | 180 | do | do | 25 | 60% slime | Do. |

Table II also sets forth tests made on lettuce using sodium benzoate alone. This was done to give an illustration of the effectiveness of sodium benzoate when used in different percentages in preserving the lettuce.

*Table II.—Lettuce—sodium benzoate*

| Grams of chemical used per 400 lbs. of tap water frozen into ice | | | | | End of 6 days | End of 9 days | End of 12 days | End of 18 days | End of 30 days |
|---|---|---|---|---|---|---|---|---|---|
| Controls, ordinary ice made from tap water same as used with chemicals | | | | | 15% slime | 40% slime | 80% slime | Decomposed | Decomposed |
| Exp. | Maleic acid, grams | Sodium benzoate, grams | Boric acid, grams | Total grams preservative in 400 lbs. ice | | | Percent | | |
| 1 | | 70 | | 70 | 15% | 40 | 80 | Decomposed. | Decomposed |
| 2 | | 80 | | 80 | 15% | 40 | 80 | do | Do. |
| 3 | | 88 | | 88 | 14% | 40 | 80 | do | Do. |
| 4 | | 90 | | 90 | 10% | 35 | 70 | do | Do. |
| 5 | | 100 | | 100 | | 32 | 68 | do | Do. |
| 6 | | 140 | | 140 | | 22 | 50 | do | Do. |
| 7 | | 180 | | 180 | Good | 15 | 40 | do | Do. |
| 8 | | 1 182 | | 182 | do | 15 | 40 | do | Do. |

1 Beyond tolerance.

It will be noted that an improvement in the sixth day keeping power did not develop until there was about 88 grams of the benzoate employed, and for real effectiveness it required as much as 180 grams to provide a prolonged preserving period for the lettuce. When 182 grams were used, it appears that there was no change.

Table III sets forth tests made on lettuce using boric acid alone.

it was not until 180 grams were employed that the slime was reduced after six days to 5%, after nine days to 20%, and after twelve days to 50%, and that it did not keep at all for eighteen days, at which time it was decomposed and had to be discarded.

Table IV sets forth tests made on lettuce using in some of the tests maleic acid and sodium benzoate, in some of the tests maleic acid and boric acid, and in some of the tests all three chemicals.

*Table III.—Lettuce—boric acid*

| Grams of chemical used per 400 lbs. of tap water frozen into ice | | | | | End of 6 days | End of 9 days | End of 12 days | End of 18 days | End of 30 days |
|---|---|---|---|---|---|---|---|---|---|
| Controls, ordinary ice made from tap water same as used with chemicals | | | | | 15% slime | 40% slime | 80% slime | Decomposed | Decomposed |
| Exp. | Maleic acid, grams | Sodium benzoate, grams | Boric acid, grams | Total grams preservative in 400 lbs. ice | Percent | Percent | Percent | | |
| 1 | | | 60 | 60 | 15 | 80 | 40 | Decomposed | Decomposed. |
| 2 | | | 80 | 80 | 15 | 40 | 80 | do | Do. |
| 3 | | | 90 | 90 | 12 | 40 | 80 | do | Do. |
| 4 | | | 100 | 100 | 11 | 35 | 70 | do | Do. |
| 5 | | | 150 | 150 | 9 | 30 | 60 | do | Do. |
| 6 | | | 180 | 180 | 5 | 20 | 50 | do | Do. |

From the table it appears that it required about 90 grams of boric acid to provide a change of 3% on the sixth day keeping power and that

*Table IV.—Lettuce—maleic acid—sodium benzoate or boric acid, combined, or all three*

| Grams of chemical used per 400 lbs. of tap water frozen into ice | | | | | End of 6 days | End of 9 days | End of 12 days | End of 18 days | End of 30 days |
|---|---|---|---|---|---|---|---|---|---|
| Controls, ordinary ice made from tap water same as used with chemicals | | | | | 15% slime | 40% slime | 80% slime | Decomposed | Decomposed |
| Exp. | Maleic acid, grams | Sodium benzoate, grams | Boric acid, grams | Total grams preservative in 400 lbs. ice | | | | | |
| 1 | 20 | 34 | | 54 | Good | 12% | 35% | 80% slime | Decomposed. |
| 2 | 20 | | 14 | 34 | 4% slime | 15% | 40% | Decomposed | Do. |
| 3 | 20 | 34 | 14 | 68 | Good | 12% | 32% | 40% slime | Do. |
| 4 | 20 | 44 | 24 | 88 | do | 12% | 32% | do | Do. |
| 5 | 25 | 34 | | 59 | do | 10% | 32% | do | Do. |
| 6 | 25 | | 14 | 39 | do | 12% | 35% | 45% slime | Do. |
| 7 | 25 | 34 | 14 | 73 | do | 8% | 25% | 40% slime | Do. |
| 8 | 25 | 41 | 24 | 90 | do | 8% | 25% | do | Do. |
| 9 | 30 | 34 | | 64 | do | 6% | 17% | 35% slime | Do. |
| 10 | 30 | | 14 | 44 | do | 8% | 20% | 40% slime | Do. |
| 11 | 30 | 34 | 14 | 78 | Excellent | Good | 15% | 30% slime | 80% slime. |
| 12 | 30 | 30 | 30 | 90 | do | do | 15% | do | Do. |
| 13 | 35 | 34 | | 69 | do | do | 15% | do | 60% slime. |
| 14 | 35 | | 14 | 49 | do | do | 17% | 35% slime | 70% slime. |
| 15 | 35 | 35 | 20 | 90 | do | do | 10% | 30% slime | 60% slime. |
| 16 | 35 | 34 | 14 | 83 | do | do | 10% | do | Do. |
| 17 | 40 | 34 | | 74 | do | do | 10% | 20% slime | 50% slime. |
| 18 | 40 | | 14 | 54 | do | do | 15% | 27% slime | 55% slime. |
| 19 | 40 | 34 | 16 | 90 | do | Very good | Good | 15% slime | 20% slime. |
| 20 | 40 | 34 | 14 | 88 | do | do | do | do | Do. |
| 21 | 42 | 34 | | 76 | do | do | do | do | 18% slime. |
| 22 | 42 | | 14 | 56 | do | Good | do | 17% slime | 20% slime. |
| 23 | 42 | 14 | 34 | 90 | do | do | do | 12% slime | 15% slime. |
| 24 | 42 | 48 | | 90 | do | Very good | do | Good | 10% slime. |
| 25 | 42 | | 48 | 90 | do | do | do | 5% slime | 18% slime. |
| 26 | 42 | 34 | 14 | 90 | do | Excellent | Excellent | Excellent | 3% slime. |
| 27 | 42.7 | 34 | 14.2 | 90.9 | do | do | do | do | Do. |
| 28 | 44 | 34 | 14 | 92 | do | do | do | do | Do. |
| 29 | 44 | 34 | 14 | 92 | do | do | do | do | Do. |
| 30 | 48 | 34 | 14 | 96 | do | do | do | do | Do. |
| 31 | 48 | 34 | 14 | 96 | do | do | do | do | Do. |
| 32 | 52 | 34 | 14 | 100 | do | do | do | do | Do. |
| 33 | 52 | 34 | 14 | 100 | do | do | do | do | Do. |

The tests show that when 20 grams of maleic acid and 34 grams of sodium benzoate were employed, the results were good at the end of six days (that is, no slime), and at the end of nine days the slime had dropped from the control of 40% to 12% slime. Hence, this indicates that a positive boosting of the sodium benzoate takes place when 20 grams of maleic acid are employed and 34 grams of sodium benzoate. From Table II it will be seen that when as much as 80 grams of sodium benzoate alone was employed, there was no advantage over the controls, that is, over ordinary ice packing.

Likewise, it will be seen that when 20 grams of maleic acid was employed with 14 grams of boric acid, there was an improvement over the controls in that at the end of six days there was only 4% slime instead of the control 15%, and at the end of nine days there was a drop from the control 40% slime to 15% slime, etc. Thus, it is shown that when 20 grams of maleic acid are employed with 14 grams of boric acid, there is a boosting of the potency of the boric acid. Referring to Table III, it will be seen that no effect of the boric acid over the control at the end of six days was developed until 90 grams of boric acid was employed. Also it will be seen that the maleic acid employed in the proportion of 20 grams had a boosting effect to the combination when sodium benzoate was employed in the amount of 34 grams and 14 grams of boric acid. Thus, when the optimum results are not required, these formulae may be employed.

Table V sets forth tests made on fish, namely, silver salmon, freshly caught, using in some of the tests maleic acid alone, in some of the tests sodium benzoate alone, and in some of the tests boric acid alone.

With boric acid, it required 200 grams before improvement resulted at the end of nine days, and there was no improvement at the end of twelve days over the control.

In treating cauliflower, the cauliflower is dipped in the solution of my invention, preferably in my solution of maleic acid, 6 to 9 parts, sodium benzoate 4 to 8 parts, and boric acid 1 to 4 parts; or my preferred formula of maleic acid 7.5 parts, sodium benzoate 6 parts, and boric acid 2.5 parts in 32,000 parts of water, for a period of time sufficient to penetrate all through said product. This may extend ten to twenty minutes. These may or may not be wrapped in paper or cellophane and then shipped to the market. These kept for three weeks in excellent marketable condition, whereas when packed according to normal procedure the product kept not to exceed six days without turning yellow. It will be remembered that such yellow portion is normally required to be trimmed off and thereby there is a loss by so much of the product. However, the very serious objection is due to the fact that there is a loss in sale value. The article by such yellowing immediately shows that it is not fresh.

In treating celery with my invention, it is subjected to a solution of one of my said formulae by dipping or by spraying. The celery is then put in crates and then held in cold storage. When shipped it is held in refrigerated cars as in normal shipping conditions of the present time.

Kale may likewise be dipped or sprayed with one of the said formulae of my invention.

Carrots may be dipped or sprayed with a solution of one of my said formulae and then are

*Table V.—Salmon (silver)*

| Grams of chemical used per 400 lbs. of tap water frozen into ice | | | | | End of 6 days | End of 9 days | End of 12 days | End of 16 days | End of 21 days |
|---|---|---|---|---|---|---|---|---|---|
| Controls, ordinary ice made from tap water same as used with chemicals | | | | | Good | 60% preserved | 40% preserved | Putrid | Putrid |
| Exp. | Maleic acid, grams | Sodium benzoate, grams | Boric acid, grams | Total grams preservative in 400 lbs. Ice | | | | | |
| 1 | 15 | | | 15 | Good | 60% preserved | 40% preserved | Putrid | Putrid. |
| 2 | 18 | | | 18 | do | 65% preserved | do | do | Do. |
| 3 | 19 | | | 19 | do | 70% preserved | 45% preserved | do | Do. |
| 4 | 30 | | | 30 | do | 75% preserved | 48% preserved | do | Do. |
| 5 | 40 | | | 40 | do | 80% preserved | 55% preserved | Strong odor | Do. |
| 6 | 60 | | | 60 | do | do | do | do | Do. |
| 7 | | 15 | | 15 | do | 60% preserved | 40% preserved | Putrid | Do. |
| 8 | | 100 | | 100 | do | do | do | do | Do. |
| 9 | | 150 | | 150 | do | 65% preserved | 45% preserved | do | Do. |
| 10 | | 200 | | 200 | do | 68% preserved | do | do | Do. |
| 11 | | | 15 | 15 | do | 60% preserved | 40% preserved | do | Do. |
| 12 | | | 150 | 150 | do | do | do | do | Do. |
| 13 | | | 200 | 200 | do | 65% preserved | do | do | Do. |

It will be seen that it required 18 grams of maleic acid when used alone to show any advantage at the end of nine days. No advantage was shown at the end of twelve days. Likewise, in the tests it will appear that when 19 and 20 grams of maleic acid was employed, the results showed an improvement of 5% in the preserving of the fish at the end of twelve days.

With sodium benzoate, the tests show that it required 150 grams before improvement was made at the end of nine days, and likewise at the end of twelve days.

held in cold storage. When shipped for short distances, they may be iced with ice formed from a solution of one of my formulae without being placed in refrigerator cars. If long distances are involved, then they would be placed in refrigerator cars, with or without ice, preferably with ice formed from the solution of one of my formulae.

Table VI sets forth tests made on fish (silver salmon) when maleic acid, sodium benzoate, and boric acid were all three employed in combination and in different percentages.

*Table VI.—Fish (silver salmon)*

| Ordinary tap water ice | | Ounces of chemicals used for 2,000 lbs tap water made into ice | Preservation in percentages | | |
|---|---|---|---|---|---|
| | | | Condition of fish end of 7 days | Condition of fish end of 14 days | Condition of fish end of 21 days |
| Controls, ordinary ice made from tap water same as used with chemicals. | | | .80 | 50 | Putrid —discarded |
| Combined preservative ices, grams chemical used in 400-lb. blocks of ice. | | | | | |
| Exp. 1 | 32.68 maleic acid | 5.75 | 85 | 70 | 50 |
| | 36.85 sodium benzoate | 6.50 | | | |
| | 21.37 boric acid | 3.75 | | | |
| | 90.90 | 16.00 | | | |
| Exp. 2 | 34.20 maleic acid | 6.0 | 95 | 90 | 80 |
| | 36.85 sodium benzoate | 6.5 | | | |
| | 19.85 boric acid | 3.5 | | | |
| | 90.90 | 16.0 | | | |
| Exp. 3 | 35.50 maleic acid | 6.5 | 97 | 92 | 85 |
| | 35.50 sodium benzoate | 6.0 | | | |
| | 19.90 boric acid | 3.5 | | | |
| | 90.90 | 16.0 | | | |
| Exp. 4 | 40.00 maleic acid | 7.0 | 98 | 95 | 90 |
| | 34.00 sodium benzoate | 6.0 | | | |
| | 16.90 boric acid | 3.0 | | | |
| | 90.90 | 16.0 | | | |
| Exp. 5 | 42.80 maleic acid | 7.5 | 99 | 97 | 95 |
| | 34.00 sodium benzoate | 6.0 | | | |
| | 14.10 boric acid | 2.5 | | | |
| | 90.90 | 16.0 | | | |
| Exp. 6 | 45.36 maleic acid | 8.0 | 99 | 95 | 93 |
| | 34.20 sodium benzoate | 6.0 | | | |
| | 14.17 boric acid | 2.5 | | | |
| | 93.73 | 16.5 | | | |
| Exp. 7 | 51.03 maleic acid | 9.0 | 97 | 90 | 80 |
| | 34.20 sodium benzoate | 6.0 | | | |
| | 14.17 boric acid | 2.5 | | | |
| | 99.40 | 17.5 | | | |

It will be noted that it required 32.68 grams of maleic acid, 36.85 grams of sodium benzoate, and 21.37 grams of boric acid to provide an increase at the end of seven days of 5% in the preserving power of the composition over the control, and at the end of 14 days there was a 20% increase in the preserving power. The fraction of grams is set forth to give a sum total of 90.90 grams for use in a 400 pound block of ice. When this is multiplied by five, it gives slightly over 16 ounces. The preferred formula has the proportions of 42.8 grams of maleic acid, 34.0 grams of sodium benzoate, and 14.10 grams of boric acid. This showed a 99% preservation of the fish at the end of seven days, a 97% preservation at the end of 14 days, and a 95% preservation at the end of 21 days. The bloom of the fish was preserved and in every respect a superior product resulted.

The tests also show that increasing the amount of the total chemicals present beyond that of the preferred formula did not give results as favorable as those when the preferred formula was used, but did provide a practical composition.

A series of cooking tests was conducted on fresh ocean crabs, known as Deep Sea or Dungeness crabs, with the preservative of my invention, for the purpose of ascertaining its preserving quality on crab.

These crabs were all alive when placed in the vats, and before dropping them in the boiling water the fishermen tore their backs off, as is the usual custom for better keeping, because then the entrails also are removed, thus leaving only bone and flesh. The crabs, for control purposes, were cooked in boiling water (tap) in the ordinary or customary manner for 15 minutes, and some were cooked for 15 minutes in boiling water to which had been added my preservative chemicals, the proportions being 3.2 ounces per 50 gallons (400 lbs.) of water, i. e., in the proportion of 16 ounces to 2,000 lbs. The 3.2 ounces of chemicals consisted of maleic acid 7.5 parts, sodium benzoate 6 parts, and boric acid 2.5 parts by weight. After cooking and cooling the meat was cracked from the bones and placed in glass jars with caps screwed on, but not hermetically sealed. Then the jars were placed in a refrigerator, i. e., held in cold storage, and held at approximately 33° F., all in the customary manner. At each inspection two jars of each were opened, that is, the leg meat and body were each packed in separate jars, therefore two jars opened. Crab meat packed in this manner, leg and body meat separate, keeps longer than when packed whole, the limit being from eight to ten days. The results were:

*Control.*—Opened on the tenth day had strong odor and pronounced inedible. Unfrozen crab meat is not expected to last beyond eight days maintained at about 33° F. This is why the product treated with my invention was opened on the tenth day, as it was not expected that the ordinarily packed or control product would keep that long. Any advantage by reason of the invention or discovery should appear then or thereafter.

*Treated crab meat.*—On the tenth day both body and leg meat in excellent condition; fine flavor and taste. On the seventeenth day excellent, with good flavor and taste. On the twenty-fourth day, still in excellent condition and edible. On the thirty-first day, still in good condition and edible. On the thirty-eighth day the body meat had a slight off odor and taste, while the leg meat was still in good condition and edible.

My invention or discovery was also tried on pure and fresh apple juice. The preferred formula of my invention was employed in the proportions of maleic acid, 7.5 parts by weight, boric acid, 2.5 parts, and sodium benzoate, 6.0 parts in 2,000 pounds of juice. The chemicals of my composition were added in the powdered form directly to the juice. The product was tested at the end of three days, seven days, fourteen days, twenty-one days, twenty-eight days, and thirty-six days. The treated product, at the end of said periods respectively showed no mold and the production of no thick matter called "mother." The control product clearly showed "mother" and mold as early as the fourth day. So far as the treated product was concerned, no change in the sweetness could be detected. The experiments and tests were all conducted at room temperature, 65° F., in the presence of experts.

Tests were made also on orange and grapefruit juice. These were not hermetically sealed, the caps being only screwed on the jars. They were treated with the preferred formula by being added directly to the juice. The control showed mold at the end of the eighth day, while there was no mold on the treated product. This held true for the treated produce on the sixteenth day and its flavor unchanged. The juice was unheated. The tests were conducted at room temperature, that is, 65° F., in the presence of experts.

My invention or discovery was also tried on the retardation of bacterial and spore producing mold on the skins of oranges, lemons, grapefruit, tangerines and guava fruit. After the said fruit was subjected to washing in the customary procedure, said fruit was treated with a solution of my preferred formula (maleic acid 7.5 parts by weight, sodium benzoate 6.0 parts, and boric acid 2.5 parts, in 32,000 parts of water) for a period of ten to fifteen minutes, by immersing while traveling through the vat, the temperature being from 100° F. to 115° F. Also experiments have been made on a commercial scale where the period of dipping was three minutes. A colder solution would take longer. These were exposed to the air and dried, and then wrapped in thin paper, all in the usual manner. There was no noticeable residue on the skin of the treated fruit. Said experiments proved successful.

As a specific example, oranges will be considered. On the control, the crates packed in usual manner and untreated, showed from 15% to 25% mold in thirty days. In contrast, oranges of same grade, simultaneously packed and treated with my invention, as set forth above, showed no mold at all at the end of thirty days. Likewise at sixty days, the oranges treated with my invention showed no mold. At ninety days said treated oranges in an entire crate (about eighty Sunkist oranges) showed one orange with a mold spot of the size of a quarter coin. At one hundred and twenty days said treated oranges in an entire crate (about eighty Sunkist oranges) showed two oranges with a mold spot of the size of a quarter coin.

An interesting test was made on some untreated oranges on which heavy, powdery blue mold had formed on one-half of each orange. These oranges were dipped into the solution of my invention of preferred formula as set forth above, for a period of fifteen minutes, after which the said fruit was placed on a shelf in the laboratory in open air for observation at room temperature. The mold dried up and did not spread further. After two or three months the whole orange dried up with no more mold appearing. Normally when the mold starts, the entire orange will rot through.

One of the great advantages of my invention or discovery is that it preserves foods with their natural taste or flavor for a plurality of times longer than is heretofore thought possible. Foods treated with my invention or discovery need not be frozen and, therefore, may have their natural taste, whereas it is well-known that serious objection has obtained to many types of frozen food in that the original flavor is lost. Particularly is this true of fish. It is to be noted that products which are preserved by quick freezing have the disadvantage that they must be used immediately when thawed out, so that it is a distinct advantage when the food can be preserved without quick freezing, both as to its taste and as to when it may be used. The natural appearance of the products is preserved by my discovery and invention. In the case of fish, it retains its bloom and freshness in appearance. In the case of vegetables, their freshness is retained.

In applying the composition of my invention, the same may be continuously sprayed as a solution so that after it is sprayed upon the upper part of the product it may drip down through the product, be collected and resprayed from above and thus be kept in circulation and thereby keep the product from decomposing by bacteria while in the raw state. This has particular application to the food on counters and in cases in stores. The present preferred form of application is to have the solution of my invention frozen into ice, then crushed, and then applied to the food, and/or it may be put over the open lettuce containers having the food therein, so that the melting ice may drip through the container. Another method of applying the antiseptic composition of my invention is as follows: In cold storage houses where fish are preserved, the fish are dipped in water and then removed, so that the film of water may be frozen in place on the fish, and this is repeated until a coating of ice of considerable thickness is provided on the fish. Then these fish are hung up and kept for as much as a year in cold storage under freezing temperatures and not allowed to thaw out. The danger arises when they are removed and are passing through the retailing steps for consumption, it being well-known that food once frozen is peculiarly subject to spoiling rapidly upon thawing. The dipping water may be prepared with my invention, that is, having my composition of chemicals above set forth dissolved therein, and the film of ice prepared just as above described and then dipped again and another film applied until a coating of ice of the desired thickness is provided for the fish. Then, when the fish is removed at the end of whatever period it is desired to remove them, the melting ice operates to preserve the fish, and they will not be subject to as prompt decomposition or deterioration as at present.

In the case of frozen foods, the composition of my invention may be applied as follows: The food can be dipped in the solution before freezing or the solution can be sprayed upon the food, such as peas, and then the package frozen; thus, if inadvertently the package should become unfrozen before use, the composition of my invention would operate to preserve the food from spoiling until the same is refrozen.

The various methods of applying my invention set forth above will serve to illustrate the great variety of modes in applying the same, and its wide range of utility.

To facilitate an understanding of the derivation of the ratios of the chemicals in the claims expressed in parts, the following computations from data in the tables are set forth—said data is expressed there in grams and pounds. They also illustrate the gradually increasing effects of the chemicals as well as substantial or approximate minimum and preferred proportions:

*Equivalents*

```
    1 Lb.  =     453.6 grams=    16 ozs.
  400 Lbs. = 181,440 grams=  6,400 ozs.
2,000 Lbs. = 907,200 grams= 32,000 ozs.

20 grams  } good     { 181,440=3.5 :32,000 minimum
30 grams  }          { 181,440=5.3 :32,000 minimum 35 grams  } excellent{ 181,440=6.17:32,000 preferred
40 grams  }          { 181,440=7.05:32,000 preferred 42 grams  }          { 181,440=7.4 :32,000 preferred
42.7 grams}          { 181,440=7.5 :32,000 preferred
44 grams  } best     { 181,440=7.76:32,000 preferred
48 grams  }          { 181,440=8.46:32,000 preferred
52 grams  }          { 181,440=9.17:32,000 preferred
```

20 grams were taken as the minimum because the experiment showed with that amount a substantial and marked improvement over the controls (untreated product) resulted. This minimum amount showed a definite retarding action on the mold or bacterial organism as the case might be. In fact, the invention has proven effective in the retardation of said organisms which attack food products or products of an organic character which support said mold or fungus growth and bacteria.

I claim:

1. The method of retarding decomposition of food in the raw state comprising treating food in the raw state with a bacteriostatic and fungicidal solution formed of maleic acid, boric acid, and sodium benzoate dissolved in water in the proportion of 6 to 9 parts of maleic acid, 1 to 4 parts of boric acid, and 4 to 8 parts of sodium benzoate in not more than 32,000 parts of water.

2. The method of retarding decomposition of food in the raw state comprising treating food in the raw state with ice prepared from a bacteriostatic and fungicidal solution of maleic acid, boric acid, and sodium benzoate dissolved in water in the following proportions: 6 to 9 parts of maleic acid, 1 to 4 parts of boric acid, and 4 to 8 parts of sodium benzoate in not more than 32,000 parts of water.

3. The method of retarding decomposition of food in the raw state comprising treating food in the raw state with ice prepared from a bacteriostatic and fungicidal solution of maleic acid, boric acid, and sodium benzoate dissolved in water in the following proportions: 7.5 parts of maleic acid, 2.5 parts of boric acid, and 6.0 parts of sodium benzoate in not more than 32,000 parts of water.

4. The method of retarding decomposition of food in the raw state comprising treating food in the raw state with ice prepared from a bacteriostatic and fungicidal solution of maleic acid, boric acid, and sodium benzoate dissolved in water in the following proportions: 6 to 9 parts of maleic acid, 1 to 4 parts of boric acid, and 4 to 8 parts of sodium benzoate in not more than 32,000 parts of water and then permitting the ice to melt gradually.

5. The method of retarding decomposition of food in the raw state comprising treating food in the raw state with ice prepared from a bacteriostatic and fungicidal solution of maleic acid, boric acid, and sodium benzoate dissolved in water in the following proportions: 7.5 parts of maleic acid, 2.5 parts of boric acid, and 6.0 parts of sodium benzoate in not more than 32,000 parts of water and permitting the ice to melt gradually.

6. The method of retarding decomposition of food in the raw state comprising treating food in the raw state with ice prepared from a bacteriostatic and fungicidal solution of maleic acid, boric acid, and sodium benzoate dissolved in water in the following proportions: 6 to 9 parts of maleic acid, 1 to 4 parts of boric acid, and 4 to 8 parts of sodium benzoate in not more than 32,000 parts of water, permitting same to melt and then refreezing.

7. The method of retarding decomposition of food in the raw state comprising treating food in the raw state with ice prepared from a bacteriostatic and fungicidal solution of maleic acid, boric acid, and sodium benzoate dissolved in water in the following proportions: 7.5 parts of maleic acid, 2.5 parts of boric acid, and 6.0 parts of sodium benzoate in not more than 32,000 parts of water, permitting same to melt and then refreezing.

8. The method of retarding decomposition of food in the raw state comprising dipping the food in the raw state in a bacteriostatic and fungicidal solution comprising maleic acid, 6 to 9 parts, boric acid, 1 to 4 parts, and sodium benzoate, 4 to 8 parts in not more than 32,000 parts of water, removing from said solution, allowing to freeze, thus forming a film of ice on the food; redipping in said solution, removing from solution and allowing to freeze, repeating said dipping, removing and allowing to freeze until a coating of ice from said solution is developed on said food.

9. The method of retarding decomposition of food in the raw state comprising dipping the food in the raw state in a bacteriostatic and fungicidal solution comprising maleic acid 7.5 parts, boric acid 2.5 parts, and sodium benzoate 6.0 parts in not more than 32,000 parts of water, removing from said solution, allowing to freeze, thus forming a film of ice on the food; redipping in said solution, removing from solution and allowing to freeze, repeating said dipping, removing and allowing to freeze until a coating of ice from said solution is developed on the food.

10. The method of retarding decomposition of food in the raw state consisting of treating food in the raw state with bacteriostatic and fungicidal solution formed of maleic acid, boric acid, and sodium benzoate dissolved in water in about the proportion by weight of 6 to 9 parts of maleic acid, 1 to 4 parts of boric acid, and 4 to 8 parts of sodium benzoate in not more than 32,000 parts of water.

11. The method of retarding decomposition of food in the raw state consisting of treating food in the raw state with ice prepared from a bacteriostatic and fungicidal solution of maleic acid, boric acid, and sodium benzoate dissolved in water in about the following proportions by weight: 6 to 9 parts of maleic acid, 1 to 4 parts of boric acid, and 4 to 8 parts of sodium benzoate in not more than 32,000 parts of water.

12. As an article of manufacture for retarding decomposition of food in the raw state, the composition of matter consisting of an aqueous solution of maleic acid 3.5 to 9 parts by weight, boric acid 1 to 4 parts, and sodium benzoate 4 to 8 parts in not more than 32,000 parts of water.

13. As an article of manufacture for retarding decomposition of food in the raw state, the composition of matter consisting of an aqueous solution of maleic acid 7.5 parts by weight, boric acid 2.5 parts, and sodium benzoate 6.0 parts in not more than 32,000 parts of water.

14. The method of retarding decomposition of lettuce in the raw state comprising treating lettuce in the raw state with a bacteriostatic and fungicidal solution comprising maleic acid by weight 7.5 parts, boric acid 2.5 parts, and sodium benzoate 6.0 parts in not more than 32,000 parts of water.

15. The method of retarding decomposition of lettuce in the raw state comprising treating lettuce in the raw state with ice prepared from a bacteriostatic and fungicidal solution comprising maleic acid, boric acid and sodium benzoate dissolved in water in the following proportions by weight: 6 to 9 parts of maleic acid, 1 to 4 parts of boric acid, and 4 to 8 parts of sodium benzoate in not more than 32,000 parts of water, and permitting said ice to melt.

16. The method of retarding decomposition of lettuce in the raw state comprising treating lettuce in the raw state with ice prepared from a bacteriostatic and fungicidal solution comprising maleic acid, boric acid, and sodium benzoate dissolved in water in the following proportions by weight: 7.5 parts of maleic acid, 2.5 parts of boric acid, and 6.0 parts of sodium benzoate in not more than 32,000 parts of water, and permitting said ice to melt.

17. The method of retarding decomposition of lettuce in the raw state comprising treating lettuce in the raw state with ice prepared from a bacteriostatic and fungicidal solution consisting of maleic acid 6 to 9 parts by weight, boric acid 1 to 4 parts, and sodium benzoate 4 to 8 parts in not more than 32,000 parts of water, and permitting said ice to melt.

18. The method of retarding decomposition in articles of the class described in the raw state comprising treating said articles in the raw state with a bacteriostatic and fungicidal solution formed of the following chemicals in not less than the following proportions by weight: maleic acid 3.5 parts and sodium benzoate 4 parts in not more than 32,000 parts of water.

19. The method of retarding decomposition in articles of the class described in the raw state comprising treating said articles in the raw state with a bacteriostatic and fungicidal solution formed of the following chemicals in not less than the following proportions by weight: maleic acid 3.5 parts and boric acid 1 part in not more than 32,000 parts of water.

20. The method of retarding decomposition in articles of the class described in the raw state comprising treating said articles in the raw state with a bacteriostatic and fungicidal solution formed of the following chemicals in not less than the following proportions by weight: maleic acid 3.5 parts, sodium benzoate 4 parts, and boric acid 1 part in not more than 32,000 parts of water.

21. The method of retarding decomposition in articles of the class described in the raw state consisting of treating said articles in the raw state with a bacteriostatic and fungicidal solution formed of the following chemicals in not less than the following proportions by weight: maleic acid 3.5 parts and sodium benzoate 4 parts in not more than 32,000 parts of water.

22. The method of retarding decomposition in articles of the class described in the raw state consisting of treating said articles in the raw state with a bacteriostatic and fungicidal solution formed of the following chemicals in not less than the following proportions by weight: maleic acid 3.5 parts and boric acid 1 part in not more than 32,000 parts of water.

23. The method of retarding decomposition in articles of the class described in the raw state consisting of treating said articles in the raw state with a bacteriostatic and fungicidal solution formed of the following chemicals in not less than the following proportions by weight: maleic acid 3.5 parts, sodium benzoate 4 parts, and boric acid 1 part in not more than 32,000 parts of water.

24. The method of retarding decomposition in articles of the class described in the raw state comprising treating said articles in the raw state with ice prepared from a bacteriostatic and fungicidal solution formed of the following chemicals in not less than the following proportions by weight: maleic acid 3.5 parts and sodium benzoate 4 parts in not more than 32,000 parts of water.

25. The method of retarding decomposition in articles of the class described in the raw state comprising treating said articles in the raw state with ice prepared from a bacteriostatic and fungicidal solution formed of the following chemicals in not less than the following proportions by weight: maleic acid 3.5 parts and boric acid 1 part in not more than 32,000 parts of water.

26. The method of retarding decomposition in articles of the class described in the raw state comprising treating said articles in the raw state with ice prepared from a bacteriostatic and fungicidal solution formed of the following chemicals in not less than the following proportions by weight: maleic acid 3.5 parts, sodium benzoate 4 parts, and boric acid 1 part in not more than 32,000 parts of water.

27. As an article of manufacture for retarding decomposition of food products in the raw state, the composition of matter comprising the following chemicals in about the following proportions by weight: maleic acid 6 to 9 parts, boric acid 1 to 4 parts, sodium benzoate 4 to 8 parts, and not more than 32,000 parts of water.

28. The method of retarding decomposition of celery in the raw state comprising treating celery in the raw state with a bacteriostatic and fungicidal solution comprising maleic acid by weight 6 to 9 parts, boric acid 1 to 4 parts, and sodium benzoate 4 to 8 parts in not more than 32,000 parts of water.

29. The method of retarding decomposition of celery in a raw state comprising treating celery in the raw state with a bacteriostatic and fungicidal solution comprising maleic acid by weight 7.5 parts, boric acid 2.5 parts, and sodium benzoate 6.0 parts in not more than 32,000 parts of water.

30. The method of retarding decomposition of celery in the raw state comprising treating celery in the raw state with ice prepared from a bacteriostatic and fungicidal solution comprising maleic acid, boric acid, and sodium benzoate dissolved in water in the following proportions by weight: 6 to 9 parts of maleic acid, 1 to 4 parts of boric acid, and 4 to 8 parts of sodium benzoate in not more than 32,000 parts of water, and permitting said ice to melt.

31. The method of retarding decomposition of celery in the raw state comprising treating celery in the raw state with ice prepared from bacteriostatic and fungicidal solution comprising maleic acid, boric acid, and sodium benzoate dissolved in water in the following proportions by weight: 7.5 parts of maleic acid, 2.5 parts of boric acid, and 6.0 parts of sodium benzoate in not more than 32,000 parts of water, and permitting said ice to melt.

32. The method of retarding decomposition of carrots in the raw state comprising treating carrots in the raw state with a bacteriostatic and fungicidal solution comprising maleic acid by weight, 6 to 9 parts, boric acid 1 to 4 parts, and sodium benzoate 4 to 8 parts in not more than 32,000 parts of water.

33. The method of retarding decomposition of carrots in the raw state comprising treating carrots in the raw state with a bateriostatic and fungicidal solution comprising maleic acid by weight 7.5 parts, boric acid 2.5 parts, and sodium benzoate 6.0 parts in not more than 32,000 parts of water.

34. The method of retarding decomposition of celery in the raw state comprising treating celery in the raw state with a bacteriostatic and fungicidal solution wherein maleic acid and sodium benzoate are present by weight not less than 3.5 parts maleic acid, not less than 4 parts sodium benzoate, and not more than 32,000 parts of water, and which contribute an effective portion of the preservative result.

35. The method of retarding decomposition of carrots in the raw state comprising treating carrots in the raw state with a bacteriostatic and fungicidal solution wherein maleic acid and sodium benzoate are present by weight not less than 3.5 parts maleic acid, not less than 4 parts sodium benzoate, and not more than 32,000 parts of water, and which contribute an effective portion of the preservative result.

36. The method of retarding decomposition of cauliflower in the raw state comprising treating cauliflower in the raw state with a bacteriostatic and fungicidal solution comprising by weight maleic acid 6 parts to 9 parts, boric acid 1 part to 4 parts, and sodium benzoate 4 parts to 8 parts, in not more than 32,000 parts of water.

37. The method of retarding decomposition of cauliflower in the raw state comprising treating cauliflower in the raw state with a bacteriostatic and fungicidal solution comprising by weight maleic acid 7.5 parts, boric acid 2.5 parts, and sodium benzoate 6.0 parts, in not more than 32,000 parts of water.

38. The method of retarding decomposition of cauliflower in the raw state comprising treating cauliflower in the raw state with ice prepared from a bacteriostatic and fungicidal solution comprising maleic acid, boric acid, and sodium benzoate, dissolved in water in the following proportions by weight: 6 parts to 9 parts of maleic acid, 1 part to 4 parts of boric acid, and 4 parts to 8 parts of sodium benzoate, in not more than 32,000 parts of water, and permitting said ice to melt.

39. The method of retarding decomposition of cauliflower in the raw state comprising treating cauliflower in the raw state with ice prepared from a bacteriostatic and fungicidal solution comprising maleic acid, boric acid, and sodium benzoate, dissolved in water in the following proportions by weight: 7.5 parts of maleic acid, 2.5 parts of boric acid, and 6.0 parts of sodium benzoate, in not more than 32,000 parts of water, and permitting said ice to melt.

40. The method of retarding decomposition of cauliflower in the raw state comprising treating cauliflower in the raw state with a bacteriostatic and fungicidal solution wherein maleic acid and sodium benzoate are present by weight not less than 3.5 parts maleic acid, not less than 4 parts sodium benzoate, and not more than 32,000 parts of water, and which contribute an effective portion of the preservative result.

41. The method of retarding decomposition of shrimp in the raw state comprising treating shrimp in the raw state with a bacteriostatic and fungicidal solution comprising by weight maleic acid 6 parts to 9 parts, boric acid 1 part to 4 parts, and sodium benzoate 4 parts to 8 parts, in not more than 32,000 parts of water.

42. The method of retarding decomposition of shrimp in the raw state comprising treating shrimp in the raw state with a bacteriostatic and fungicidal solution comprising by weight maleic acid 7.5 parts, boric acid 2.5 parts, and sodium benzoate 6.0 parts, in not more than 32,000 parts of water.

43. The method of retarding decomposition of shrimp in the raw state comprising treating shrimp in the raw state with ice prepared from a bacteriostatic and fungicidal solution comprising maleic acid, boric acid, and sodium benzoate, dissolved in water in the following proportions by weight: 6 parts to 9 parts of maleic acid, 1 part to 4 parts of boric acid, and 4 parts to 8 parts of sodium benzoate, in not more than 32,000 parts of water, and permitting said ice to melt.

44. The method of retarding decomposition of shrimp in the raw state comprising treating shrimp in the raw state with ice prepared from a bacteriostatic and fungicidal solution comprising maleic acid, boric acid, and sodium benzoate, dissolved in water in the following proportions by weight: 7.5 parts of maleic acid, 2.5 parts of boric acid, and 6.0 parts of sodium benzoate, in not more than 32,000 parts of water, and permitting said ice to melt.

45. The method of retarding decomposition of shrimp in the raw state comprising treating shrimp in the raw state with a bacteriostatic and fungicidal solution wherein maleic acid and sodium benzoate are present by weight not less than 3.5 parts of maleic acid, not less than 4 parts of sodium benzoate, and not more than 32,000 parts of water, and which contribute an effective portion of the preservative result.

46. The method of retarding decomposition of lettuce in the raw state comprising treating lettuce in the raw state with a bacteriostatic and fungicidal solution wherein maleic acid and sodium benzoate are present by weight not less than 3.5 parts of maleic acid, not less than 4 parts of sodium benzoate, and not more than 32,000 parts of water, and which contribute an effective portion of the preservative result.

LAWRENCE FRANDSEN.

REFERENCES CITED

The following references are of record in the file of this patent:

UNITED STATES PATENTS

| Number | Name | Date |
| --- | --- | --- |
| 987,868 | Ellis | Mar. 28, 1911 |
| 1,635,461 | Cramer | July 12, 1927 |
| 1,898,363 | Greenbank | Feb. 21, 1933 |
| 2,159,986 | Gray et al. | May 30, 1939 |

FOREIGN PATENTS

| Number | Country | Date |
| --- | --- | --- |
| 12,839 | Great Britain | 1911 |